US012382230B2

(12) United States Patent
Lovchinsky et al.

(10) Patent No.: US 12,382,230 B2
(45) Date of Patent: *Aug. 5, 2025

(54) HEARING AIDS WITH PARALLEL NEURAL NETWORKS

(71) Applicant: Chromatic Inc., New York, NY (US)

(72) Inventors: Igor Lovchinsky, New York, NY (US); Philip Meyers, IV, San Francisco, CA (US); Jonathan Macoskey, Pittsburgh, PA (US); Israel Malkin, Manhattan Beach, CA (US); Andrew Casper, Eau Claire, WI (US); Nicholas Morris, Brooklyn, NY (US)

(73) Assignee: Chromatic Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/511,314

(22) Filed: Nov. 16, 2023

(65) Prior Publication Data

US 2025/0080924 A1 Mar. 6, 2025

Related U.S. Application Data

(63) Continuation of application No. 18/239,321, filed on Aug. 29, 2023, now Pat. No. 11,838,727.

(51) Int. Cl.
*H04R 25/00* (2006.01)

(52) U.S. Cl.
CPC .................................. *H04R 25/507* (2013.01)

(58) Field of Classification Search
CPC ...... H04R 17/00; H04R 17/005; H04R 17/02; H04R 17/025; H04R 25/505;
(Continued)

(56) References Cited

U.S. PATENT DOCUMENTS 11,245,993 B2 * 2/2022 Andersen ................. G06N 3/08
11,270,198 B2 * 3/2022 Busch .................. H04R 25/507
(Continued)

FOREIGN PATENT DOCUMENTS

CN 105611477 A 5/2016
KR 102316626 B1 10/2021

OTHER PUBLICATIONS

International Search Report and Written Opinion from International Application No. PCT/US2024/044085 mailed Dec. 23, 2024, 8 pages.

(Continued)

*Primary Examiner* — Ryan Robinson
(74) *Attorney, Agent, or Firm* — Shih IP Law Group, PLLC

(57) ABSTRACT

An apparatus (e.g., an ear-worn device such as a hearing aid) includes neural network circuitry and control circuitry. The neural network circuitry is configured to implement a neural network system comprising at least a first neural network and a second neural network operating in parallel. The control circuitry is configured to control the neural network system to receive a first input signal, process the first input signal using the first neural network to produce a first output and using the second neural network to produce a second output, combine the first output and the second output, reset one or more states of the first neural network, and reset one or more states of the second neural network at a different time than when the one or more states of the first neural network are reset.

20 Claims, 10 Drawing Sheets

(58) Field of Classification Search
CPC .............. H04R 25/507; H04R 2225/41; H04R 2225/43; H04R 2460/01; H10N 30/00; G06N 3/044; G06N 3/02; G06N 3/0442; G10L 21/0208; G10L 25/30; G10L 21/0272; G10L 25/84; G10L 21/0264; G10L 21/0216
See application file for complete search history.

(56) References Cited

U.S. PATENT DOCUMENTS

| | | | | | |
|---|---|---|---|---|---|
| 11,647,344 | B2 * | 5/2023 | Chen | H04R 25/507 | |
| | | | | 381/317 | |
| 11,678,120 | B2 * | 6/2023 | Nyayate | G10L 25/84 | |
| | | | | 381/94.1 | |
| 11,696,079 | B2 * | 7/2023 | Jelčicová et al. | H04R 25/407 | |
| | | | | 381/317 | |
| 2022/0124444 | A1 * | 4/2022 | Andersen | H04R 25/507 | |
| 2023/0209283 | A1 * | 6/2023 | Wagner | H04R 25/606 | |
| | | | | 381/312 | |
| 2023/0292074 | A1 * | 9/2023 | Marquardt | H04S 7/30 | |

OTHER PUBLICATIONS

J. Zegers, et al., "Analysis of Memory in LSTM-RNNs for Source Separation", arxiv.org, Cornell University Library, 201 Olin Library Cornell University Ithaca, NY 14853, Sep. 1, 2020, XP081753424, 23 pages.

* cited by examiner

HEARING AIDS WITH PARALLEL NEURAL NETWORKS

This application is a Continuation of U.S. Ser. No. 18/239,321, filed Aug. 29, 2023, which is incorporated herein by reference.

BACKGROUND

Field

The present disclosure relates to multiple neural networks running in parallel, for example in hearing aids.

Related Art

Hearing aids are used to help those who have trouble hearing to hear better. Typically, hearing aids amplify received sound. Some hearing aids attempt to remove environmental noise from incoming sound.

SUMMARY

According to one aspect, a hearing aid includes neural network circuitry and control circuitry. The neural network circuitry is configured to implement a neural network system including at least a first neural network and a second neural network operating in parallel. The control circuitry is configured to control the neural network system to reset one or more states of the first neural network at a first time; receive a first input audio signal at a second time later than the first time; process the first input audio signal using the first neural network to produce a first output and using the second neural network to produce a second output; combine the first output and the second output using a first weight for the first output and a second weight for the second output, where the second weight is greater than the first weight; receive a second input audio signal at a third time later than the second time; process the second input audio signal using the first neural network to produce a third output and using the second neural network to produce a fourth output; combine the third output and the fourth output using a third weight for the third output and a fourth weight for the fourth output, where the third weight is greater than the first weight; and reset one or more states of the second neural network at a fourth time later than the third time.

In some embodiments, the control circuitry is further configured to control the neural network system to receive a third input audio signal at a fifth time later than the fourth time; process the third input audio signal using the first neural network to produce a fifth output and using the second neural network to produce a sixth output; combine the fifth output and the sixth output using a fifth weight for the fifth output and a sixth weight for the sixth output, where the fifth weight is greater than the sixth weight; receive a fourth input audio signal at a sixth time later than the fifth time; process the fourth input audio signal using the first neural network to produce a seventh output and using the second neural network to produce an eight output; and combine the seventh output and the eighth output using a seventh weight for the seventh output and an eighth weight for the eighth output, where the eighth weight is greater than the sixth weight.

In some embodiments, all layers of the first neural network operate at a given time and fewer than all layers of the second neural network operate in parallel at the given time. In some embodiments, the neural network system is configured, when resetting the one or more states of the first neural network at the first time, to reset one or more states of one layer of the first neural network. In some embodiments, the neural network system is further configured to reset one or more states of a different layer of the first neural network at a time later than the first time. In some embodiments, the neural network system is configured, when processing the first input audio signal using the first neural network to produce the first output and using the second neural network to produce the second output, to process the first input audio signal using one layer of the first neural network to produce the first output and to process the first input audio signal using one layer of the second neural network to produce the second output. In some embodiments, the neural network system is further configured to feed the combined first and second outputs to a subsequent layer of the first neural network.

In some embodiments, the neural network system is configured to run the first neural network for a warmup period after the first time but weight an output of the first neural network at zero. In some embodiments, the neural network system is configured to turn off the first neural network for an off period prior to the first time.

In some embodiments, weights applied to outputs of the first neural network depend, at least in part, on how much time has elapsed since resetting the one or more states of the first neural network. In some embodiments, weights applied to outputs of the first neural network transition from low to high after resetting the one or more states of the first neural network, and then transition from high to low prior to a next resetting of one or more states of the first neural network.

In some embodiments, the neural network circuitry is implemented on a chip in the hearing aid.

In some embodiments, the first output from the first neural network includes a combination of multiple outputs from the first neural network. In some embodiments, the neural network system is configured to wait until the first neural network has produced the multiple outputs prior to determining the first output.

In some embodiments, the first and second weights are determined from a weighting scheme including a linear piecewise function or a smooth function.

In some embodiments, a time between resetting one or more states of the first neural network is approximately equal to or between 1 second and 60 seconds.

In some embodiments, the first neural network and the second neural network are trained to denoise audio signals.

In some embodiments, the first neural network and the second neural network include a same algorithm and same parameters. In some embodiments, the first neural network and the second neural network include a different algorithm and/or different parameters. In some embodiments, the first neural network and the second neural network include recurrent neural networks.

According to one aspect, an apparatus includes neural network circuitry and control circuitry. The neural network circuitry is configured to implement a neural network system including at least a first neural network and a second neural network operating in parallel. The control circuitry is configured to control the neural network system to receive a first input signal, process the first input signal using the first neural network to produce a first output and using the second neural network to produce a second output, combine the first output and the second output, reset one or more states of the first neural network, and reset one or more states of the second neural network at a different time than when the one or more states of the first neural network are reset.

In some embodiments, the control circuitry is configured to control the neural network system to combine the first output and the second output using a first weight for the first output and a second weight for the second output, where the second weight is different from the first weight. In some embodiments, the control circuitry is configured to control the neural network system to reset the one or more states of the first neural network at a first time and receive the first input signal at a second time later than the first time, and the second weight is greater than the first weight. In some embodiments, the control circuitry is further configured to control the neural network system to receive a second input signal at a third time later than the second time; process the second input signal using the first neural network to produce a third output and using the second neural network to produce a fourth output; combine the third output and the fourth output using a third weight for the third output and a fourth weight for the fourth output, where the third weight is greater than the first weight; and reset the one or more states of the second neural network at a fourth time later than the third time. In some embodiments, the control circuitry is further configured to control the neural network system to receive a third input audio signal at a fifth time later than the fourth time; process the third input audio signal using the first neural network to produce a fifth output and using the second neural network to produce a sixth output; combine the fifth output and the sixth output using a fifth weight for the fifth output and a sixth weight for the sixth output, where the fifth weight is greater than the sixth weight;

receive a fourth input audio signal at a sixth time later than the fifth time; process the fourth input audio signal using the first neural network to produce a seventh output and using the second neural network to produce an eight output; and combine the seventh output and the eighth output using a seventh weight for the seventh output and an eighth weight for the eighth output, where the eighth weight is greater than the sixth weight.

In some embodiments, all layers of the first neural network operate at a given time and fewer than all layers of the second neural network operate in parallel at the given time. In some embodiments, the neural network system is configured, when resetting the one or more states of the first neural network at the first time, to reset one or more states of one layer of the first neural network. In some embodiments, the neural network system is further configured to reset one or more states of a different layer of the first neural network at a time later than the first time. In some embodiments, the neural network system is configured, when processing the first input audio signal using the first neural network to produce the first output and using the second neural network to produce the second output, to process the first input audio signal using one layer of the first neural network to produce the first output and to process the first input audio signal using one layer of the second neural network to produce the second output. In some embodiments, the neural network system is further configured to feed the combined first and second outputs to a subsequent layer of the first neural network.

In some embodiments, the neural network system is configured to run the first neural network for a warmup period after the first time but weight an output of the first neural network at zero. In some embodiments, the neural network system is configured to turn off the first neural network for an off period prior to the first time.

In some embodiments, weights applied to outputs of the first neural network depend, at least in part, on how much time has elapsed since resetting one or more states of the first neural network. In some embodiments, weights applied to outputs of the first neural network transition from low to high after resetting the one or more states of the first neural network, and then transition from high to low prior to a next resetting of one or more states of the first neural network.

In some embodiments, the neural network circuitry is implemented on a chip in the apparatus.

In some embodiments, the first output from the first neural network includes a combination of multiple outputs from the first neural network. In some embodiments, the neural network system is configured to wait until the first neural network has produced the multiple outputs prior to determining the first output.

In some embodiments, the first and second weights are determined from a weighting scheme including a linear piecewise function or a smooth function.

In some embodiments, a time between resetting one or more states of the first neural network is approximately equal to or between 1 second and 60 seconds.

In some embodiments, the first neural network and the second neural network are trained to denoise audio signals.

In some embodiments, the first neural network and the second neural network include a same algorithm and same parameters. In some embodiments, the first neural network and the second neural network include a different algorithm and/or different parameters.

In some embodiments, the first neural network and the second neural network include recurrent neural networks.

In some embodiments, the apparatus includes an ear-worn device. In some embodiments, the apparatus includes a hearing aid. In some embodiments, the first input signal includes an audio signal.

Some aspects include a method of operating an apparatus (e.g., an ear-worn device, such a hearing aid) configured as described above.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in all the figures in which they appear.

DETAILED DESCRIPTION

Figure 1:
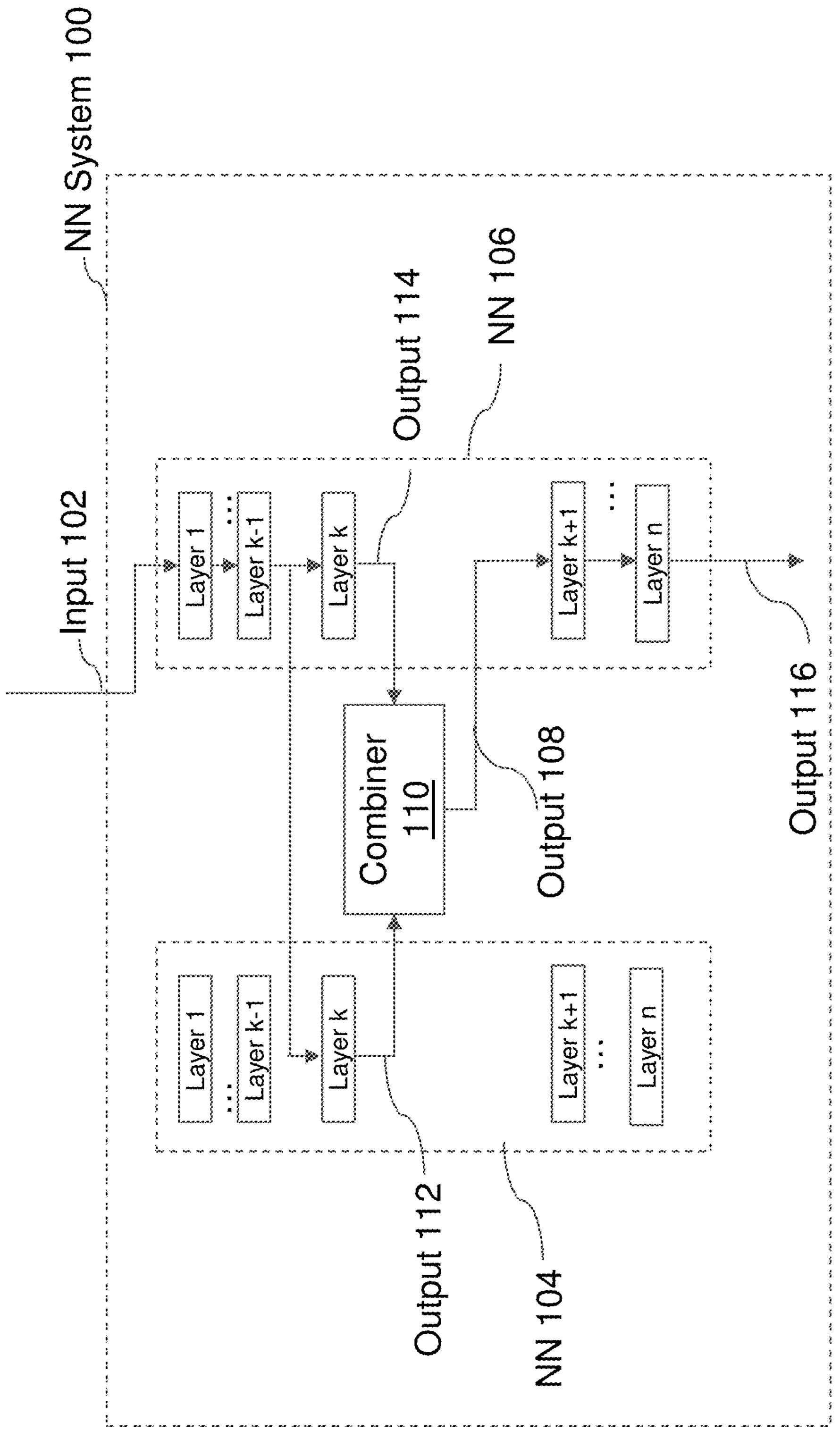
FIG. 1 is a diagram of a neural network system, in accordance with certain embodiments described herein.

A recurrent neural network (RNN) is a type of neural network in which the result of processing at one time step may affect the processing at a subsequent time step. RNNs thus have "states" that can persist from one time step to another and represent context information derived from analysis of previous inputs. It should be appreciated that other types of neural networks may also be stateful (i.e., have and use states) and may also use the methods described herein.

An RNN may include an input layer, one or more RNN layers, and an output layer. Each RNN layer may include input nodes, output nodes, and states. In some embodiments, there may be one type of state and the states may be referred to as "hidden states." In some embodiments, such as a long short-term memory (LSTM) type of RNN, there may be two types of states and the states may be referred to as "hidden states" and "cell states." At each time step, the states from the previous time step may be concatenated with the inputs from the current time step.

Recurrent neural networks and other stateful neural networks may suffer from drawbacks. Over time, states in a neural network may drift and attain sets of values they never attained during training. As a result, the neural network may suffer degradation in performance over time. Such degradation in performance over the long term may be avoided by resetting certain states (i.e., one or more states) of the neural network. Doing so, however, may come with the drawback that, immediately after resetting the states, performance of the neural network may be degraded because the neural network is operating without the benefit of the context information derived from processing prior inputs. Therefore, although resetting the states may address the problem of states drifting to values they never attained during training, a different problem is created.

The inventors have discovered that to address both problems with stateful neural networks, multiple neural networks may operate in parallel on the same input, but their states may be reset at times offset from each other. In this manner, the problem of long-term degradation can be avoided for both neural networks, and at any given point in time at least one of the neural networks may have established state information aiding in calculation of its output. The output of the neural networks may be processed in combination such that the combined output from the parallel neural networks utilizes more heavily the prediction from the neural network whose states are at an optimal point of processing. The neural network system may thus reduce its reliance on a neural network whose states are at a non-optimal point. In other words, the output from one neural network may be weighted more than the output of another neural network. For example, the weight for a neural network that has been reset recently may be lower than the weight for another neural network. The parallel neural networks may have different algorithms and different parameters, or the same algorithm and parameters. Due to staggered reset times for states, the parallel neural networks may have different states even if their algorithms and parameters are the same.

In general, one or more states in a neural network may be reset. In some embodiments, all states in the neural network may be reset. In some embodiments, only certain types of states in a neural network may be reset. For example, in an LSTM neural network, in some embodiments only cell states but not hidden states may be reset. In some embodiments, only certain states of one or more layers of a neural network may be reset, and states from different layers or groups of layers may be reset at different times. As a specific example, all states of one layer (e.g., layer 1) may be reset at one time, then all states of a different layer (e.g., layer 2) may be reset at another time, etc. Thus, as referred to herein, resetting one or more states of a neural network may refer to resetting all the states of the neural network, resetting only certain states (e.g., states of a certain type or types) of the neural network, resetting all the states of one or more layers (e.g., one layer) of a neural network, and/or resetting certain states (e.g., states of a certain type or types) of one or more layers (e.g., one layer) of a neural network.

As referred to herein, resetting a state may refer to actively changing values in the state to 0, or actively changing values in the state to a different value other than zero. Additionally, as referred to herein, resetting a state may refer to actively changing values in the state immediately, or over a finite length of time. In the latter case, the reset may be smooth, such that the values in the state decay over time to zero or to a different value.

Conventional ear-worn devices (such as hearing aids, cochlear implants, earphones, etc.) receive an input acoustic signal, amplify the signal, and output it to the wearer. Hearing aid performance can be improved by utilizing neural networks, for example to denoise audio signals. In some embodiments, parallel RNNs such as those described herein may be implemented in an ear-worn device such as a hearing aid. The inputs to the neural networks may be based on audio received by one or more microphones on the hearing aid, and the outputs of the parallel neural networks may be combined in a weighted combination to develop the output that is played back to the wearer by a receiver of the hearing aid. However, while some embodiments of the technology described herein may relate to hearing aids or other ear-worn devices such as cochlear implants and earphones, this should be understood to be non-limiting, and it should be appreciated that any device implementing stateful neural networks may utilize this technology as well.

The aspects and embodiments described above, as well as additional aspects and embodiments, are described further below. These aspects and/or embodiments may be used individually, all together, or in any combination of two or more, as the disclosure is not limited in this respect.

FIG. 1 is a diagram of a neural network (NN) system 100, in accordance with certain embodiments described herein. The neural network system 100 may be implemented, for example, by neural network circuitry (e.g., the neural network circuitry 720) and may be part of a device such as a hearing aid or other ear-worn device. As shown in FIG. 1, the neural network system 100 includes two neural networks 104 and 106 for parallel processing, and a combiner 110. While two neural networks are shown, the neural network system 100 is not so limited and may include more than two neural networks, such as four neural networks. The neural networks 104 and 106 may each be a recurrent neural network or another type of stateful neural network. The neural network may be trained to denoise audio signals.

FIG. 1 illustrates that each of the neural networks 104 and 106 includes n layers. While FIG. 1 illustrates at least 5 layers in each of the neural networks 104 and 106, it should be appreciated that fewer than 5, 5, or more than 5 layers may be used.

As illustrated, the neural network 106 receives an input 102. In the context of a hearing aid, for example, the input

102 may be an input audio signal. In some embodiments, the input 102 may undergo processing prior to input to the neural network system 100. For example, in the context of a hearing aid, the input audio signal may undergo analog processing (e.g., preamplification and/or filtering) and digital processing (e.g., wind reduction, beamforming, anti-feedback, Fourier transformation, and calibration). The input signal may also be broken up into snippets (e.g., as described with reference to FIG. 4) and the input 102 may be one snippet of the input signal. The neural network 106 may then process the input 102 with each of its layers in turn. As illustrated, layer k of both the neural network 104 and the neural network 106 may receive an input from layer k−1 of the neural network 106. The neural network 104 may process that input to produce the output 112 and the neural network 106 may process that input to produce the output 114. The combiner 110 may combine the outputs 112 and 114 to produce an output 108, which is then fed into layer k+1 of the neural network 106. The neural network 106 may complete processing with all n of its layers and produce the output 116.

Thus, FIG. 1 illustrates that layer k of the neural networks 104 and 106 are operating in parallel at a given time. It should be appreciated that, at any given time, any of the layers may operate in parallel. For example, layer 1 of the neural networks 104 and 106 may operate in parallel at a given time, and the combiner 110 may combine the outputs of layer 1 from both neural networks. It should also be appreciated that, at any given time, more than 1 layer may operate in parallel. For example, layers 1 and 2 of the neural networks 104 and 106 may operate in parallel at a given time. In some embodiments, when multiple layers operate in parallel at a given time, only the output from the last parallel layer may be combined. For example, if layers 1 and 2 operate in parallel at a given time, then the output of layer 1 from the neural network 104 would go into layer 2 of the neural network 104, the output of layer 1 from the neural network 106 would go into layer 2 of the neural network 106, and the outputs of both layers 2 would be combined by the combiner 110. Alternatively, the output of every respective pair of parallel layers may be combined. For example, if layers 1 and 2 operate in parallel at a given time, then the outputs of both layers 1 would be combined, the output of that combination would go into both layers 2, and the outputs of both layers 2 would be combined. It should also be appreciated that the layers operating in parallel may change with time. For example, as will be described with reference to FIG. 3, layers 1 may operate in parallel at one time, then layers 2 may operate in parallel at a different time, etc.

Figure 3:
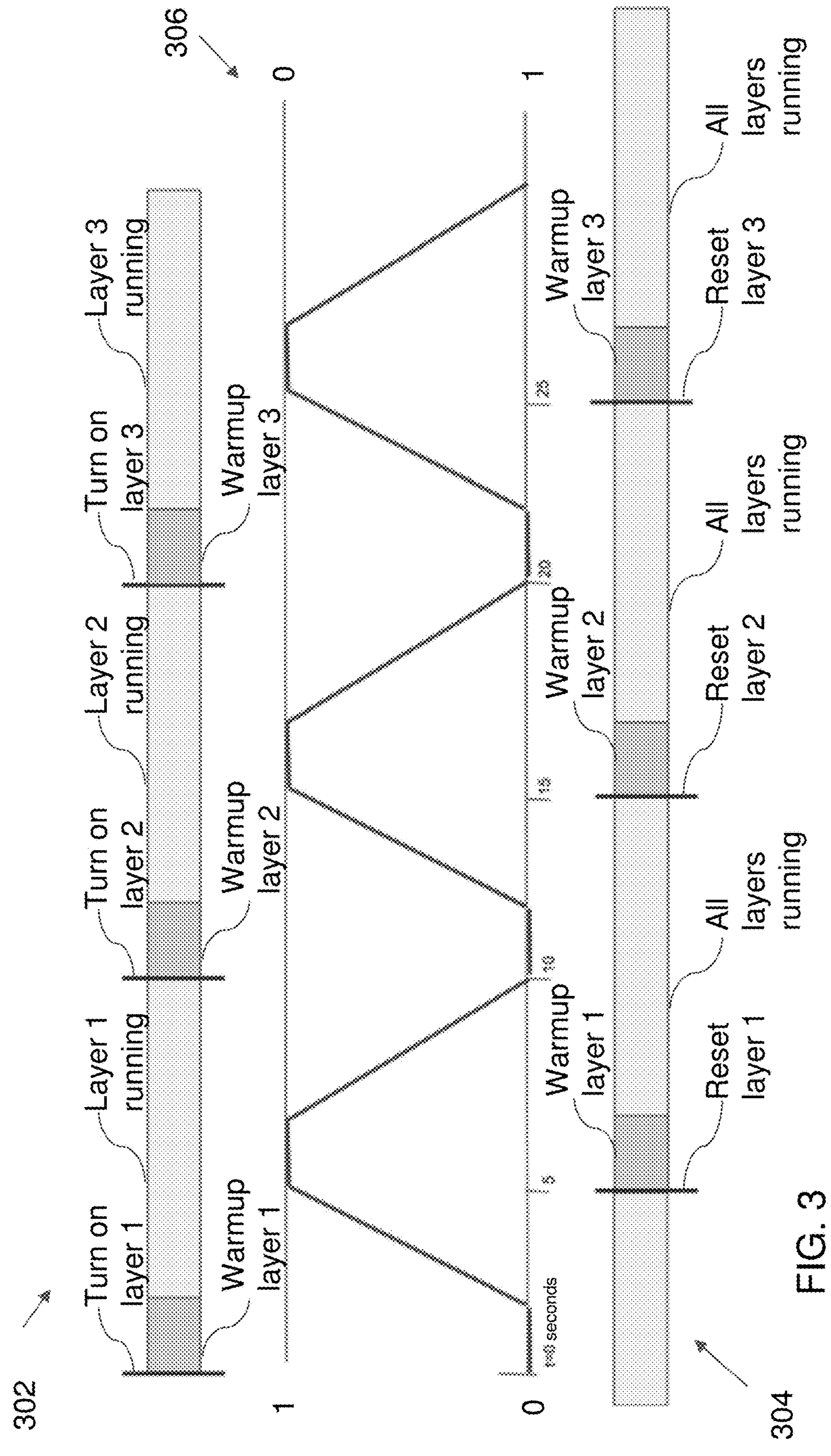
FIG. 3 illustrates schedules and a weighting scheme for two neural networks, in accordance with certain embodiments described herein.

It should be appreciated from the above that, at a given time, one full neural network (e.g., the neural network 106) may be operating (i.e., all its layers running) while in parallel at the same time less than a full neural network (e.g., one layer of the neural network 104 or fewer than all layers of the neural network 104) may be operating. An example schedule for parallel operation of layers in different neural networks is illustrated in FIG. 3. At an extreme, all layers of the neural networks 104 and 106 (e.g., the full neural networks) may run in parallel at a given time. In such embodiments, just the final outputs (e.g., the outputs from layer n) of each neural network may be combined by the combiner 110 to produce the output 116 of the neural network system 100, or the outputs of each respective pair of layers may be combined by the combiner 110 before being fed to the next layer in each neural network.

In some embodiments, the output 116 of the neural network system 100 may be an output that the neural network system 100 uses to reduce a noise component of the signal to obtain an enhanced output. For example, the neural network system output 116 may be a mask that, when multiplied by the input 102, leaves just the speech portion of an input audio signal remaining. In some embodiments, the neural network system output 116 may be the enhanced output. For example, in the context of a hearing aid, the neural network system output 116 may be the speech portion of the input 102.

The combiner 110 may combine the outputs 112 and 114 of the neural networks 104 and 106 in any suitable manner. In some embodiments, the outputs of neural networks 104 and 106 may be combined according to a weighting scheme. For example, the combiner 110 may multiply the output 112 by a first weight, multiply the output 114 by a second weight (which may be different than the first weight), and add the two products together. Example weighting schemes are described further herein.

Each of the neural networks 104 and 106 may be a separate neural network. Each of the neural networks 104 and 106 may have a different algorithm with different parameters. Alternatively, each of the neural networks 104 and 106 may have the same algorithm with the same parameters. Therefore, each of the neural networks 104 and 106 may have the same algorithm with the same set of parameters. The states of each of the neural networks 104 and 106 may change as the neural network runs, and may be different from one another, for example, due to staggered reset times. In some embodiments, using the same parameters for each neural network may save memory (e.g., in a device such as a hearing aid implementing the neural networks).

As referred to herein, the output of a neural network should be understood to include the output of any layer or layers of the neural network. Thus, the output of a neural network, as referred to herein, may be the output of the first layer of the neural network, an intermediate layer of the neural network, the final layer of the neural network, or any combination of multiple layers. Similarly, processing an input by a neural network should be understood to include processing the input by any layer or layers of the neural network.

Figure 2:
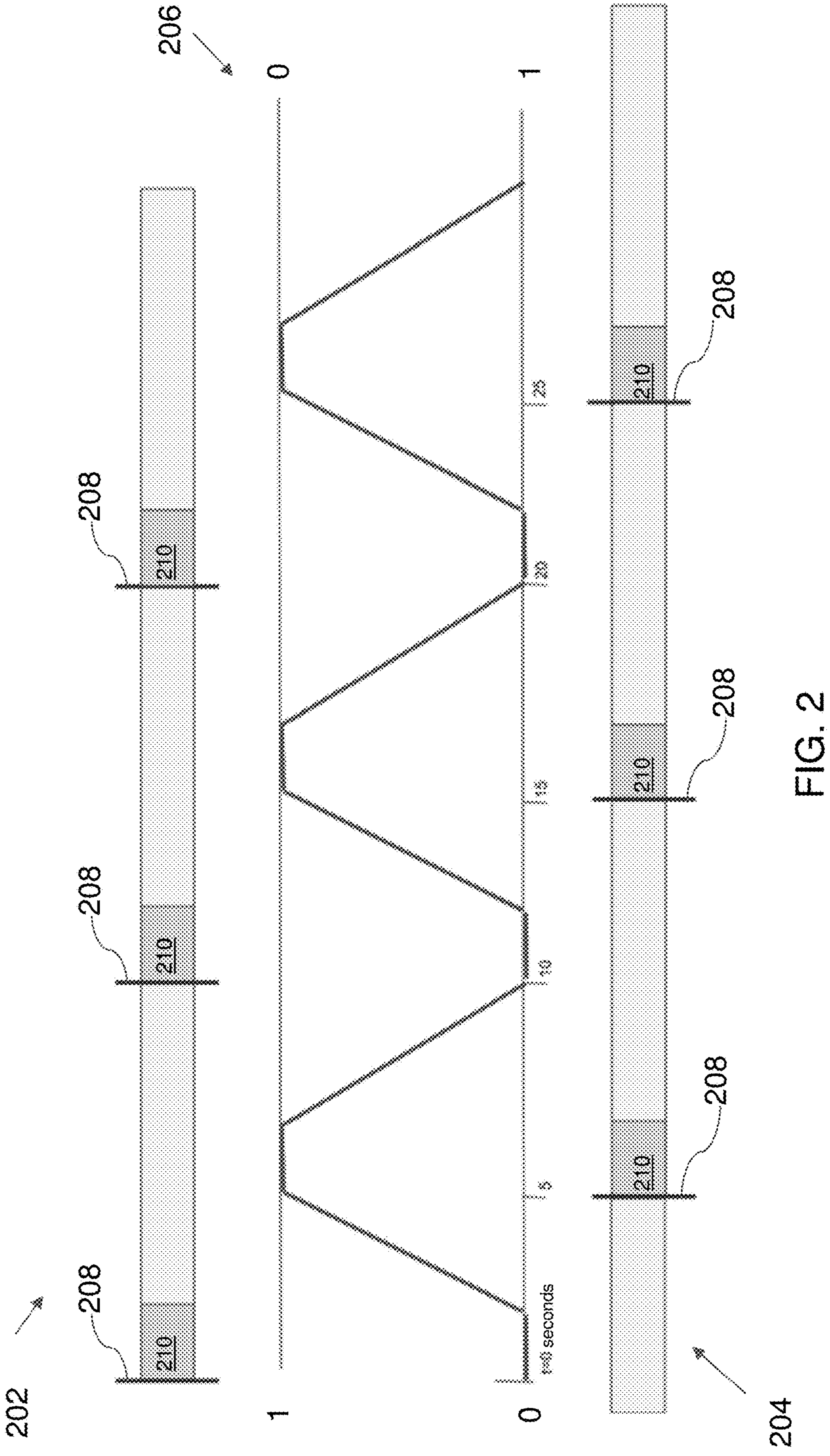
FIG. 2 illustrates schedules and a weighting scheme for two neural networks, in accordance with certain embodiments described herein.

FIG. 2 illustrates schedules and a weighting scheme for two neural networks, in accordance with certain embodiments described herein. FIG. 2 illustrates a first schedule 202 for a first neural network (e.g., the neural network 104) and a second schedule 204 for a second neural network (e.g., the neural network 106). While FIG. 2 illustrates schedules for two neural networks, it should be appreciated that there may be more than two neural networks operating in parallel. Certain states (i.e., one or more states) in each neural network may be reset after a period of time, occurring at resets 208. For example, in a neural network that just includes hidden states, in some embodiments all the hidden states may be reset. As another example, in a neural network that includes hidden states and cell states, in some embodiments all the cell states, but not the hidden states, may be reset. As another example, states of one layer of a neural network may be reset at each reset 208, and states from different layers may be reset at different resets 208. In the example of FIG. 2, each of the neural networks resets one or more of its states after 10 seconds, as indicated by the time between resets 208 in each of the schedules 202 and 204. It should be appreciated that other times between resets may be used. As non-limiting examples, the neural networks may reset after 1 seconds, 5 seconds, 20 seconds, 30 seconds, 45 seconds, 60 seconds, 2 minutes, 5 minutes, 10 minutes, 15 minutes, 30 minutes, 45 minutes, 1 hour, 2 hours, 3 hours, or any other suitable amount of time. For example, the time between resets may be approximately equal to or between 1-10 seconds, 1-20 seconds, 1-30 seconds, 1-45 seconds, 1-60 seconds, 1 second-2 minutes, 1 second-5 minutes, 1 second-10 minutes, 1 second-15 minutes, 1 second-30 minutes, 1 second-45 minutes, 1 second-1 hour, 1 second-2 hours, 1 second-3 hours, 5-10 seconds, 5-20 seconds, 5-30 seconds, 5-45 seconds, 5-60 seconds, 5 seconds-2 minutes, 5 seconds-5 minutes, 5 seconds-10 minutes, 5 seconds-15 minutes, 5 seconds-30 minutes, 5 seconds-45 minutes, 5 seconds-1 hour, 5 seconds-2 hours, 5 seconds-3 hours, 10-20 seconds, 10-30 seconds, 10-45 seconds, 10-60 seconds, 10 seconds-2 minutes, 10 seconds-5 minutes, 10 seconds-10 minutes, 10 seconds-15 minutes, 10 seconds-30 minutes, 10 seconds-45 minutes, 10 seconds-1 hour, 10 seconds-2 hours, 10 seconds-3 hours, as non-limiting example ranges. The time between resets 208 may be related to how long it typically takes for the performance of a neural network to degrade beyond a performance threshold due to the drifting of states described above.

In the example of FIG. 2, the resets 208 for the two neural networks do not occur at the same times; instead, the resets 208 of the first schedule 202 are offset from the resets 208 of the second schedule 204. By offsetting the resets 208 for the first and second neural networks, it may be possible to run one neural network while another neural network goes through resetting and warming up. In particular, as further illustrated in FIG. 2, each neural network has a warmup period 210, namely a period of time after a reset 208 when the neural network is on but during which its weighting is 0%. Warmup periods 210 may be helpful because for the period of time immediately after a reset 208 of states in a neural network, the neural network may be operating without the benefit of the context information derived from processing prior inputs, and thus its performance may be degraded. The warmup period 210 may afford a neural network the opportunity to attain the benefit of context information prior to being used to produce an output (i.e., prior to its weighting being increased above 0). Thus, the staggered resetting may enable the warmup periods 210. Staggered resetting may also enable diversification in the neural network processing, allowing for different states. However, in some embodiments, the resets 208 of the two neural networks may occur simultaneously.

The outputs of the neural networks may be weighted prior to being combined together. As described above, the output of a neural network should be understood to include the output of any layer or layers of the neural network. Thus, the output of a neural network described with reference to FIG. 2 may be the output of the first layer of the neural network, an intermediate layer of the neural network, the final layer of the neural network, or any combination of multiple layers. At an extreme, the output may be the output of a full neural network. Additionally, references to weighting applied to a neural network should be understood to mean weighting applied to an output of a neural network, with output having the meaning just provided. FIG. 2 illustrates an example weighting scheme 206, which shows the scale for weighting applied to the first neural network on the left, ranging from 0 at the bottom to 1 at the top, and the scale for weighting applied to the second neural network on the right, ranging from 1 at the bottom to 0 at the top, as functions of time. It should be appreciated that, in the example of FIG. 2, the weight for each neural network at any given time is one minus the weight applied to the other neural network. Thus, when the first neural network is weighted at 1, the second neural network is weighted at 0, and vice versa. In between the minimums and maximums, the weighting scheme 206 may follow a linear function, such that the weights may take on values between 0 and 1 (e.g., 0.5).

In general, the weighting scheme may be a linear piecewise function, a smooth function such as a sinusoidal function, or another function to transition the weight between neural networks. Thus, the weighting scheme may be a dynamic weighting scheme such that a first weight for a first neural network output and a second weight for a second neural network output change over a period of time. Such a dynamic weighting scheme may include variable weights that correspond to different reset timings, such as a first and second variable weight that may transition from values between 0 and 1.

In some embodiments, a controller (e.g., implemented by control circuitry 726) may calculate the weights for each neural network on the fly. In such embodiments, it may be helpful to use linear functions for the weighting scheme to reduce the computational complexity for the controller. For example, the controller may only need to calculate the weight for one neural network, and then the weight for the other neural network may be obtained by subtracting the first weight from one. Nevertheless, in some embodiments, each neural network may have an independent schedule, and the controller may calculate the weights for each independently. In some embodiments, the weights may be stored in memory and the controller may need not calculate the weights on the fly.

Certain weighting schedules described herein (e.g., in FIGS. 2, 3, 5, and 6) use weights that may depend, at least in part, on how much time has elapsed since the last reset. Weights may transition from low to high (in some embodiments, after an off period and/or warmup period) following a reset, and then transition from high to low before the next reset.

In some embodiments, the weights may be determined based on a confidence metric associated with each neural network's output, such that when the two neural networks are combined, the neural network with the higher quality/confidence is weighted higher. For example, one confidence metric may be frame-to-frame consistency, as consistency in a neural network's output may generally correlate strongly with the neural network's confidence. A neural network that is not confident may have outputs that are very different across frames.

In some embodiments, the reset may not occur at a fixed interval but rather during periods in which the neural network can reset with minimal impact. For example, in some embodiments, one of the neural networks may transition and reset during a period of silence. In some embodiments, periods of silence may be used for resetting and can allow for only one neural network to be used. In other words, even immediately after resetting, the output of the neural network may be used, as the period of silence is likely to continue after resetting, and the neural network is not likely to introduce artifacts during periods of silence. The periods of silence may consist of neither speech nor noise above a threshold, (e.g., 20 dB, 40 dB, or 60 dB).

In some embodiments, the reset may occur only when necessary. By using metrics to monitor the quality of the neural network output, the controller may determine whether a reset is necessary. Once a metric (e.g., frame-to-frame consistency) crosses a certain threshold, a reset may be initiated, beginning with a second neural network being initialized. Once the second neural network completes its warmup period, then the weights may begin shifting to incorporate the second neural network output more into the combined output.

FIG. 3 illustrates schedules and a weighting scheme for two neural networks, in accordance with certain embodiments described herein. As described above, at a given time, one full neural network (e.g., the neural network 106) may be operating (e.g., all its layers running) while in parallel at the same time less than a full neural network (e.g., one layer of the neural network 104 or fewer than all layers of the neural network 104) may be operating. FIG. 3 is a version of FIG. 2 illustrating schedules for such neural networks in more detail. FIG. 3 illustrates a first schedule 302 for a first neural network (e.g., the neural network 104) and a second schedule 304 for a second neural network (e.g., the neural network 106). Only one layer of the first neural network runs at a time, while all layers of the second neural network run all the time. Before a layer of the second neural network resets, the corresponding layer of the first neural network turns on, and the outputs of the two corresponding layers are combined according to the weighting scheme 306. The weighting scheme 306 shows the scale for weighting applied to the first neural network on the left, ranging from 0 at the bottom to 1 at the top, and the scale for weighting applied to the second neural network on the right, ranging from 1 at the bottom to 0 at the top, as functions of time. In the example of FIG. 3, the weighting is applied to whatever outputs (which may be just the output of one layer) are being combined. In other words, there may be one or two "versions" of a layer running at a time. When there is one version then the output of that layer is just the output of that one layer, and that will be fed to the next layer. When there are two versions then the output of that layer will be a weighted combination of the outputs of the versions, and that weighted combination will be fed to the next layer. While the first schedule 302 illustrates one layer running at a time, it should be appreciated that a subset of layers may also be running at a time. Similarly, while the second schedule 304 illustrates one layer resetting at a time, it should be appreciated that a subset of layers may reset at a time. While FIG. 3 illustrates two neural networks in parallel, in some embodiments there may be more than two.

Figure 4:
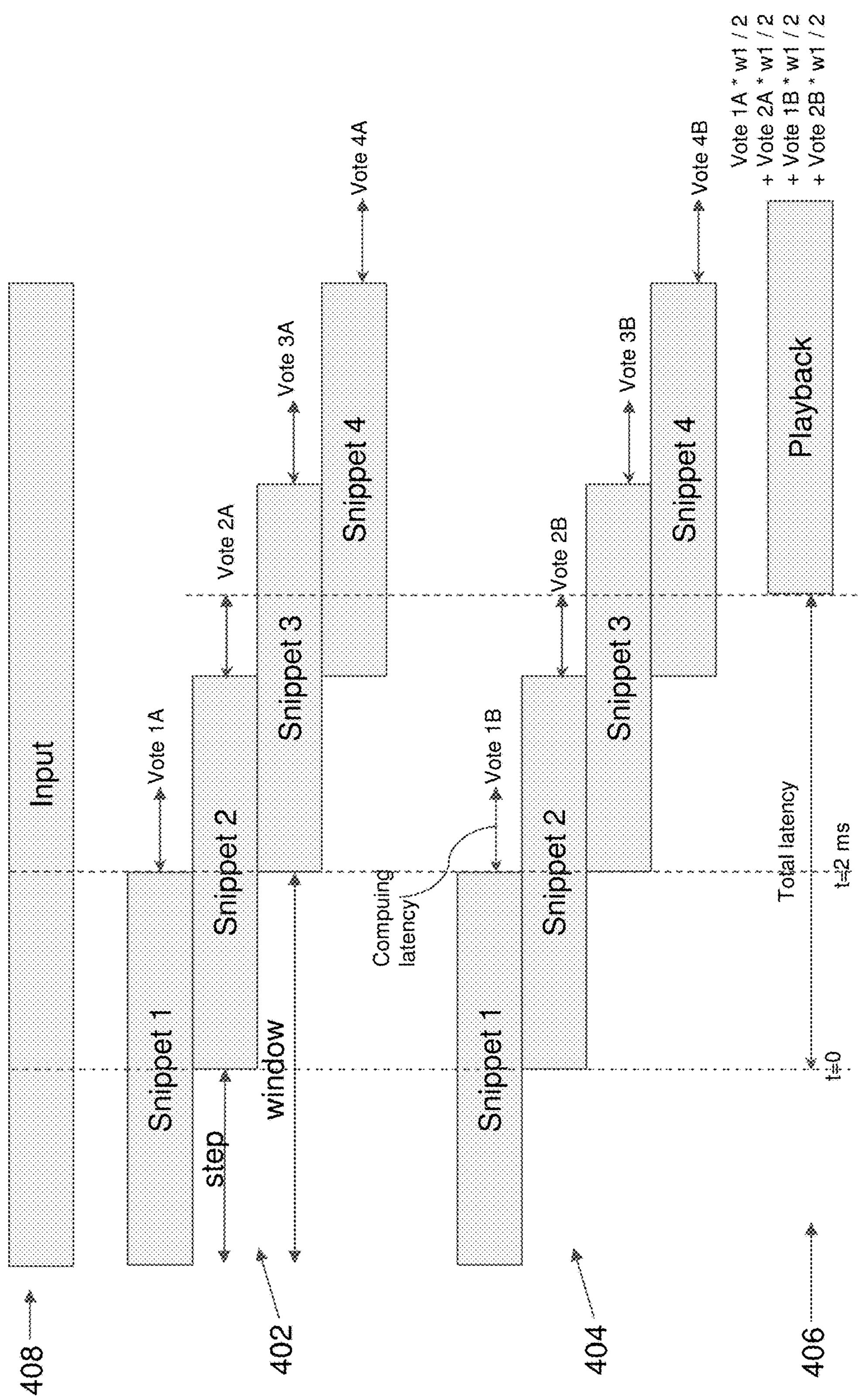
FIG. 4 illustrates a scheme for processing snippets of data, in accordance with certain embodiments described herein.

FIG. 4 illustrates a scheme for processing snippets of data, in accordance with certain embodiments described herein. FIG. 4 illustrates a timeline 408 for input data, a timeline 402 for processing by a first neural network (e.g., the neural network 104), a timeline 404 for processing by a second neural network (e.g., the neural network 106), and a timeline 406 for playback. The output played back may be a version of the input data that has been processed by the two neural networks operating in parallel. For example, in the context of a hearing aid, the output played back may be played back by the receiver of the hearing aid, and may be a version of the audio that entered the microphone after processing by two or more denoising neural networks.

The input data may be sampled as snippets of data, and each snippet of data may be a certain amount of time long ("window"), and may begin a certain amount of time after the previous snippet began ("step"). In some embodiments, the window may be between 1 and 10 ms, such as 4 ms. In some embodiments, the step may be between 1 and 5 ms, such as 2 ms. In a non-limiting embodiment in which the window is 4 ms and the step is 2 ms, every 2 ms, the 4 most recent milliseconds of input data may be passed through each neural network. Depending on the window and step sizes, multiple snippets may sample the same input data. For example, in FIG. 4, both snippets 1 and 2 sample the input data from t=0 to t=2 ms.

As illustrated, after a time corresponding to computing latency, each neural network produces an output based on a snippet of data. The output from each neural network may be referred to as a vote. As described above, the output of a neural network should be understood to include the output of any layer or layers of the neural network. Thus, the output of a neural network as described with reference to FIG. 4 may be the output of the first layer of the neural network, an intermediate layer of the neural network, the final layer of the neural network, or any combination of multiple layers. The processing scheme may wait for each neural network to produce more than one vote for a given segment of input data. For example, the portion of input data lasting from t=0 to t=2 ms may receive votes 1A and 1B from the first neural network and votes 1B and 2B from the second neural network. The processing scheme may include waiting until the second vote on the relevant portion of input data from each neural network (i.e., votes 2A and 2B) has been produced before beginning playback of the output, even though a first vote was already produced earlier. Thus, for the input data that begins at t=0, FIG. 4 illustrates the total latency from when input data starts at t=0 until the time when the corresponding output begins to play back.

The outputs from each neural network may be combined, and the combined output may be used to produce the final output that is played back. For example, the combined output may include averaging the relevant votes, or using a weighting scheme. In the example of FIG. 4, a weight w1/2 is assigned to each of the two votes from the first neural network and a weight w2/2 is assigned to each of the two votes from the second neural network. In some embodiments, the weights for each neural network may be different; for example, the values of w1 and w2 may be selected to favor one neural network's votes over another. In some embodiments, the weights for each neural network may be the same (i.e., w1=w2).

Figure 5:
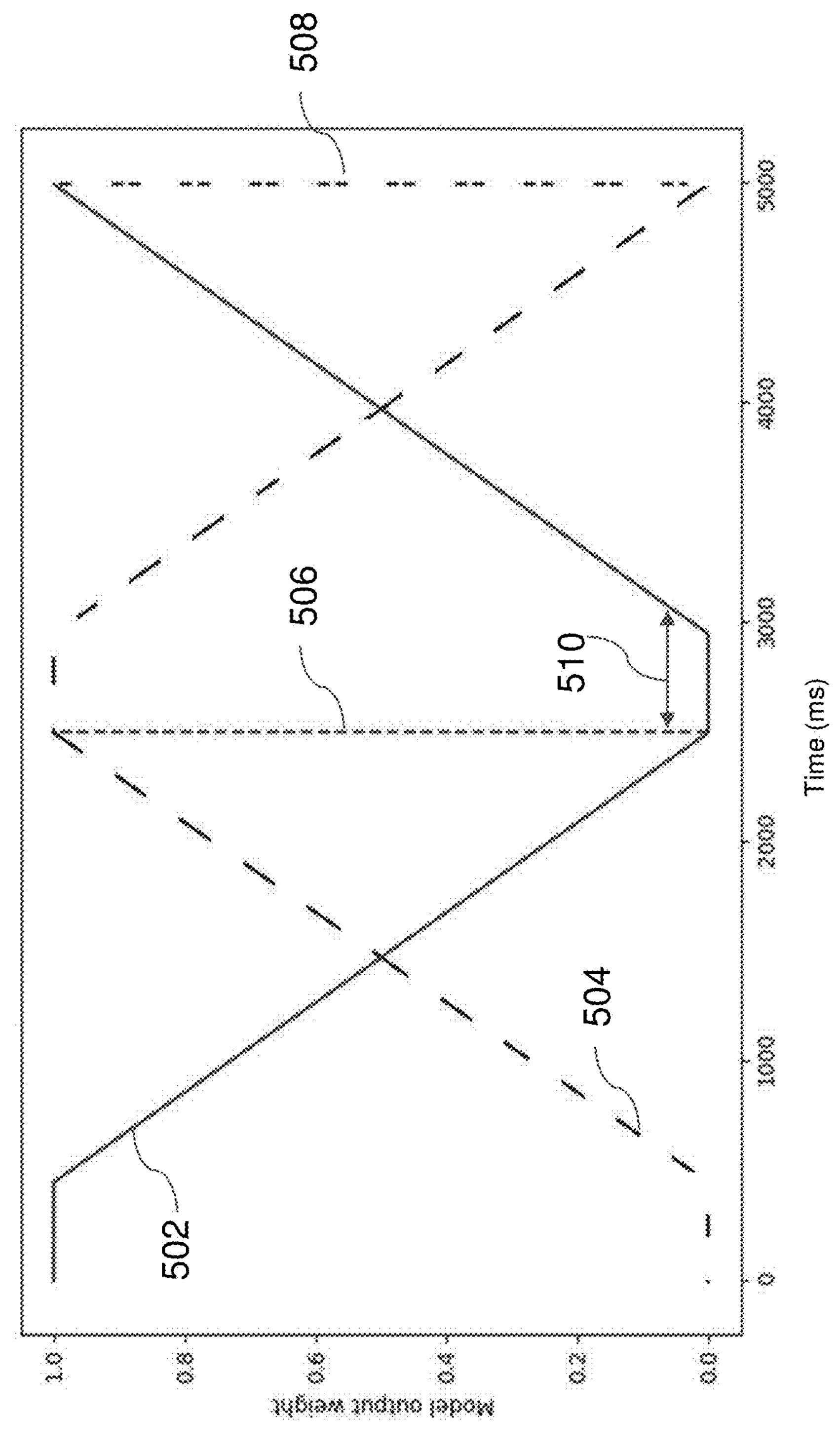
FIG. 5 illustrates a graph of an example weighting schedule and reset schedule, in accordance with certain embodiments described herein.

FIG. 5 illustrates a graph of an example weighting schedule and reset schedule, in accordance with certain embodiments described herein. FIG. 5 illustrates a first weighting schedule 502 for the output of a first neural network (e.g., the neural network 104), a second weighting schedule 504 for the output of a second neural network (e.g., the neural network 106), a reset time 506 for the first neural network, and a reset time 508 for the second neural network. As described above, the output of a neural network should be understood to include the output of any layer or layers of the neural network. Thus, the output of a neural network described with reference to FIG. 5 may be the output of the first layer of the neural network, an intermediate layer of the neural network, the final layer of the neural network, or any combination of multiple layers. Additionally, references to weighting applied to a neural network should be understood to mean weighting applied to an output of a neural network.

As shown by the first weighting schedule 502, the first neural network may be weighted at 1 for a time, then transition from 1 to 0 during a transition time, and then reset at the reset time 506. After the reset time 506 of the first neural network, the first neural network may continue to be on but be in a warmup period 510. Following the warmup period for the first neural network, the weighting of the first neural network begins to transition from 0 to 1 as shown by the first weighting schedule 502. While the first neural network is in the warmup period, the second neural network is weighted at 1. The second neural network may follow an opposite weighting and reset schedule as shown by the second weight schedule 504 and the reset time 508. While FIG. 5 illustrates a warmup period 510 of approximately 0.45 seconds, some embodiments may have a warmup period of other suitable lengths of time, for example between 0.1 and 2.0 seconds.

Figure 6:
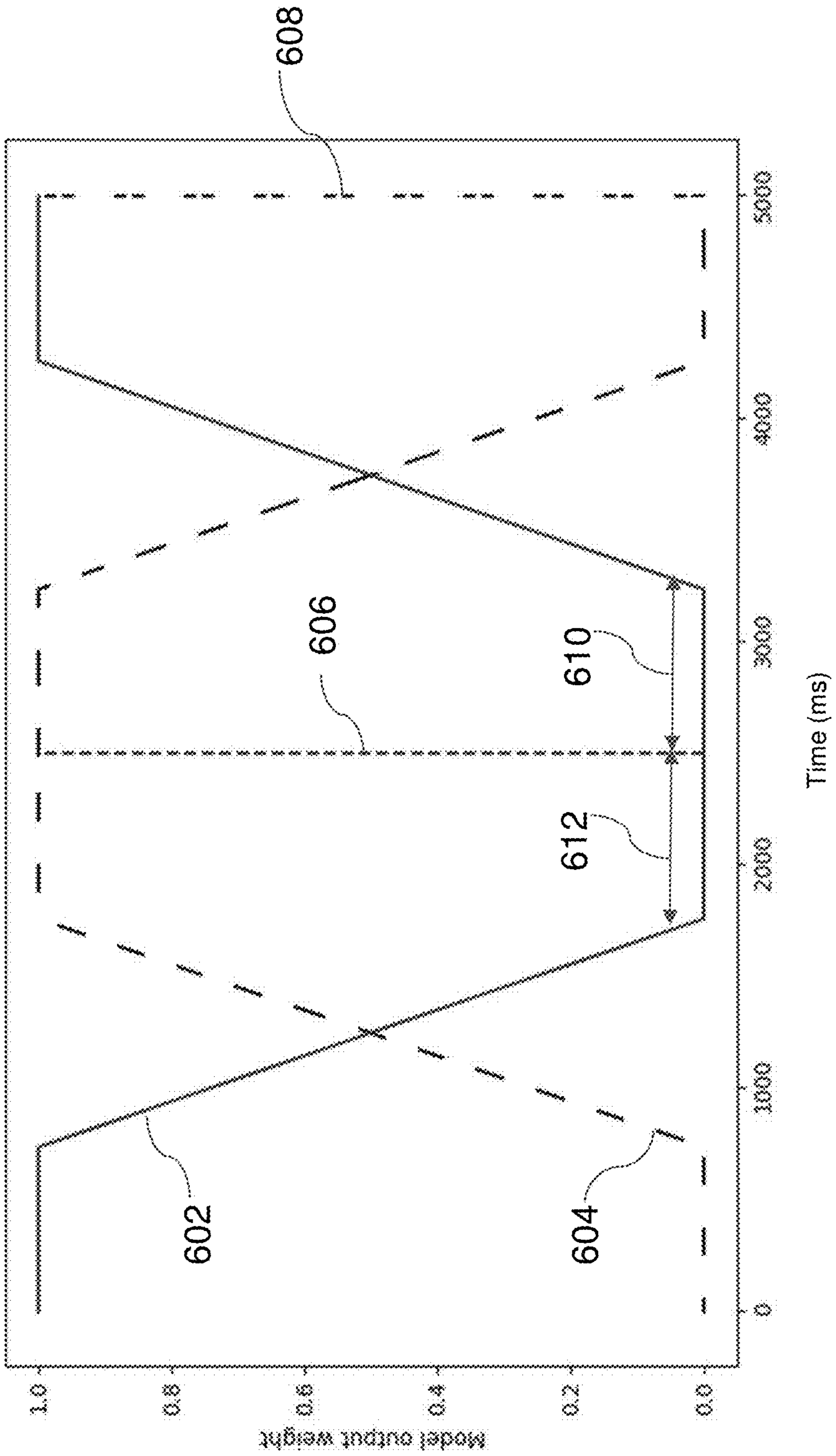
FIG. 6 illustrates a graph of an example weighting schedule and reset schedule, in accordance with certain embodiments described herein.

FIG. 6 illustrates a graph of an example weighting schedule and reset schedule, in accordance with certain embodiments described herein. FIG. 6 illustrates a first weighting schedule 602 for the output of a first neural network (e.g., the neural network 104), a second weighting schedule 604 for the output of a second neural network (e.g., the neural network 106), a reset time 606 for the first neural network, and a reset time 608 for the second neural network. As described above, the output of a neural network should be understood to include the output of any layer or layers of the neural network. Thus, the output of a neural network described with reference to FIG. 6 may be the output of the first layer of the neural network, an intermediate layer of the neural network, the final layer of the neural network, or any combination of multiple layers. Additionally, references to weighting applied to a neural network should be understood to mean weighting applied to an output of a neural network.

As shown by the first weighting schedule 602, the first neural network may be weighted at 1 for a time, then transition from 1 to 0 during a transition time. During an off period 612, the first neural network is off. At a reset time 606, the first neural network turns on and resets, and then continues to be on but in a warmup period 610. Following the warmup period 610 for the first neural network, the weighting of the first neural network begins to transition from 0 to 1 as shown by the first weighting schedule 602. While the first neural network is in the warmup period, the second neural network is weighted at 1. The second neural network may follow an opposite weighting and reset schedule as shown by the second weight schedule 604 and the reset time 608. While FIG. 6 illustrates an off period 612 and a warmup period 610 each approximately 0.74 seconds long, some embodiments may have off periods and warmup periods of other suitable lengths of time, for example between 0.1 and 2.0 seconds.

Thus, in some embodiments, one neural network may be running alone for a period of time. For example, in FIG. 6, the second neural network runs alone during the off period 612. In some embodiments, a first neural network may run alone and then a second neural network may begin operation after a period of time has elapsed. At that time, the second neural network may warm up, starting to build meaningful states. After a warmup period, the outputs of the second neural network may be utilized. After another period of time, a reset may begin for the first neural network in which the first neural network ends operation and then resets. After a period of time has elapsed, the first neural network warms up, and then after a warmup period, outputs of the first neural network may be utilized.

As described above, in some embodiments two full neural networks may operate in parallel, whereas in other embodiments one full neural network may operate in parallel with one layer or a subset of layers of another neural network. Assuming that two full neural networks are operating in parallel, in the example of FIG. 5, each neural network is on 100% of the time. In the example of FIG. 6, both neural networks are running simultaneously approximately 70.48% of the time. However, other percentages are possible as well.

Let P be the power consumed by a full neural network running. The inventors have appreciated that when two neural networks are running 100% of the time, such as in FIG. 5, power consumption may be 2P at all times. It may be helpful to reduce the amount of time that both neural networks are running simultaneously, such as in FIG. 6, to reduce power consumption. In FIG. 6, the power consumption is 2P for only 70.48% of the time. Additionally or alternatively, the two weighting schedules may not be opposites of each other. For example, compared with FIG. 6, if the weighting schedule for the first neural network could remain at 1 for longer and/or the warmup period for the first neural network could be shorter, then the amount of time that both neural networks are running simultaneously may be shorter, and the power consumption may be reduced.

Assuming that the one full neural network is operating in parallel with one layer or a subset of layers of a second neural network, the power consumption may be even less. For example, if the second neural network only has at most one of its n layers running at a time, then the power consumption may only rise as high as $(1+1/n)\times P$ at a time.

Generally, it should be appreciated that a neural network such as an RNN may have multiple layers each including multiple states. For example, a network with n layers each including m states may have a total of n*m states. With two parallel neural networks, there may be a total of 2*n*m states. In some embodiments, resetting the states of the two neural networks at different times may mean that the n*m states of one neural network are all reset at the same time ("first time"), the n*m states of the other neural network are all reset at the same time ("second time"), but the first and second times are different. In some embodiments, even the states of one neural network may be reset at different times. For example, all 2*n*m states in the system of two neural networks may be reset at different times.

Further description of neural networks, training neural networks, and implementing neural networks in hearing aids may be found in U.S. Patent Application Publication No. US20230232169A1, entitled "Method, Apparatus, and System for Neural Network Hearing Aid," filed Jan. 14, 2022 and published Jul. 20, 2023, which is herein incorporated by reference in its entirety.

Figure 7:
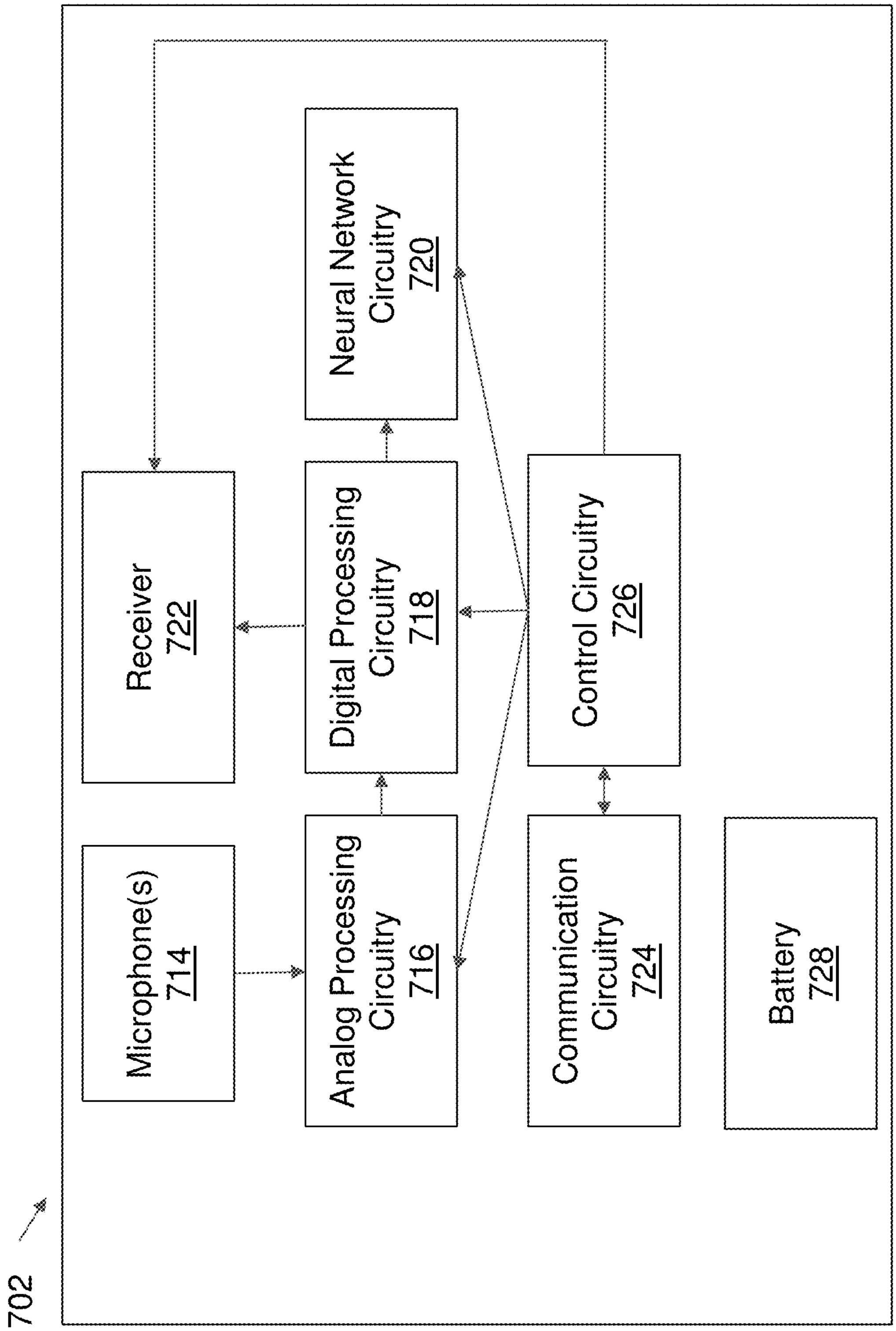
FIG. 7 illustrates a block diagram of an ear-worn device, in accordance with certain embodiments described herein.

FIG. 7 illustrates a block diagram of an ear-worn device 702, in accordance with certain embodiments described herein. The ear-worn device 702 may be any type of ear-worn device (e.g., a hearing aid, cochlear implant, earphone, etc.) and may be any of such ear-worn devices described herein. The ear-worn device 702 includes one or more microphones 714, analog processing circuitry 716, digital processing circuitry 718, neural network circuitry 720, a receiver 722, communication circuitry 724, control circuitry 726, and a battery 728. It should be appreciated that the ear-worn device 702 may include more elements than illustrated.

The one or more microphones 714 may be configured to receive sound and convert the sound to analog electrical signals. The analog processing circuitry 716 may be configured to receive the analog electrical signals representing the sound and perform various analog processing on them, such as preamplification, filtering, and analog-to-digital conversion, resulting in digital signals. The digital processing circuitry 718 may be configured to receive the digital signals from the analog processing circuitry 716 and perform various digital processing on them, such as wind reduction, beamforming, anti-feedback processing, Fourier transformation, input calibration, wide-dynamic range compression, output calibration, and inverse Fourier transformation.

The neural network circuitry 720 may be configured to receive digital signals from the digital processing circuitry 718 and process the signals with a neural network to perform denoising (e.g., separation of speech from noise into separate subsignals) as described above. The neural network circuitry 720 may be configured to implement multiple recurrent neural networks operating in parallel (e.g., the neural network system 100). While the neural network circuitry 720 may receive audio signals that have been processed (e.g., by the analog processing circuitry 716 and the digital processing circuitry 718) subsequent to their reception by the one or more microphones 714, this may still be referred to herein as the neural network circuitry 720 denoising audio signals received by the one or more microphones 714. The outputs of the neural network circuitry 720 may be routed back to the digital processing circuitry 718 for further processing. The receiver 722 may be configured to receive the final audio signals and output them as sound to the user.

In some embodiments, the analog processing circuitry 716 may be implemented on a single chip (i.e., a single semiconductor die or substrate). In some embodiments, the digital processing circuitry 718 may be implemented on a single chip. In some embodiments, the neural network circuitry 720 may be implemented on a single chip. In some embodiments, the analog processing circuitry 716 (or a portion thereof) and the digital processing circuitry 718 (or a portion thereof) may be implemented on a single chip. In some embodiments, the digital processing circuitry 718 (or a portion thereof) and the neural network circuitry 720 (or a portion thereof) may be implemented on a single chip. In some embodiments, the analog processing circuitry 716 (or a portion thereof), the digital processing circuitry 718 (or a portion thereof), and the neural network circuitry 720 (or a portion thereof) may be implemented on a single chip. In some embodiments, denoised signals output by the neural network circuitry 720 on one chip may be routed to a different chip (e.g., a chip including digital processing circuitry 718 and/or analog processing circuitry 716) which may then route them to the receiver 722 for output to the user. In some embodiments, the receiver 722 may be incorporated into a chip also incorporating some or all of the analog processing circuitry 716, the digital processing circuitry 718, and the neural network circuitry 720. All the chips described herein may be in the ear-worn device 702.

The communication circuitry 724 may be configured to communicate with other devices over wireless connections, such as Bluetooth, WiFi, LTE, or NFMI connections. The control circuitry 726 may be configured to control operation of the analog processing circuitry 716, the digital processing circuitry 718, the neural network circuitry 720, the communication circuitry 724, and the receiver 722.

Figure 8A:
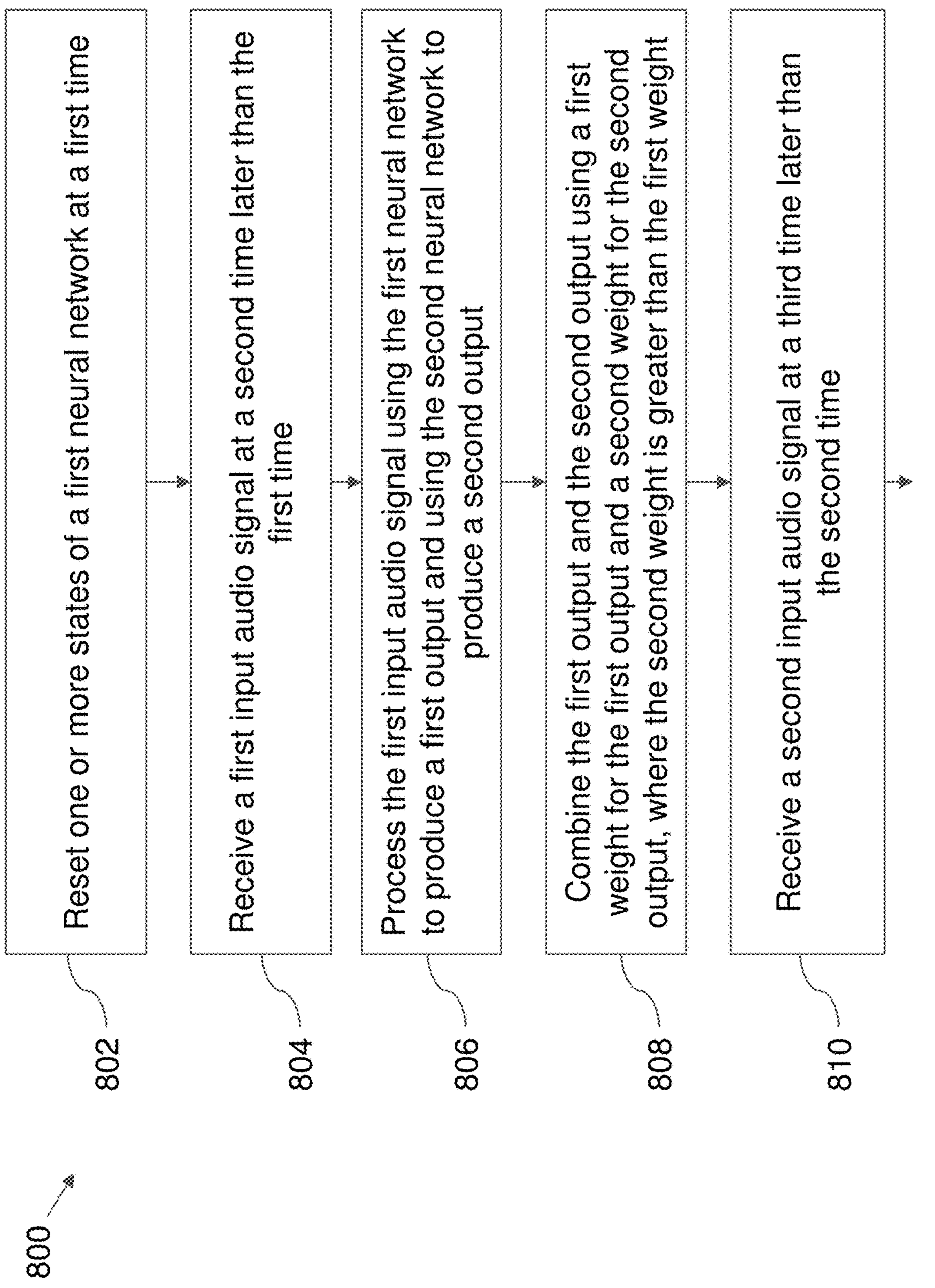
FIGS. 8A and 8B illustrates a process for processing data using multiple parallel neural networks, in accordance with certain embodiments described herein.
Figure 8B:
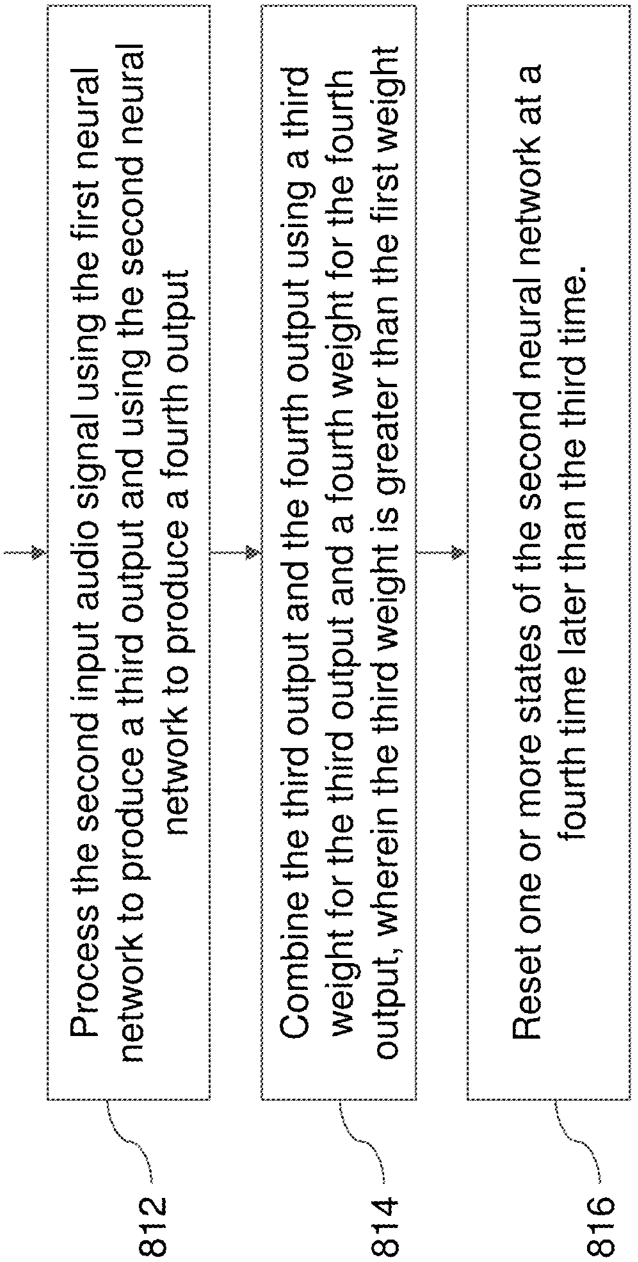
Figure 9:
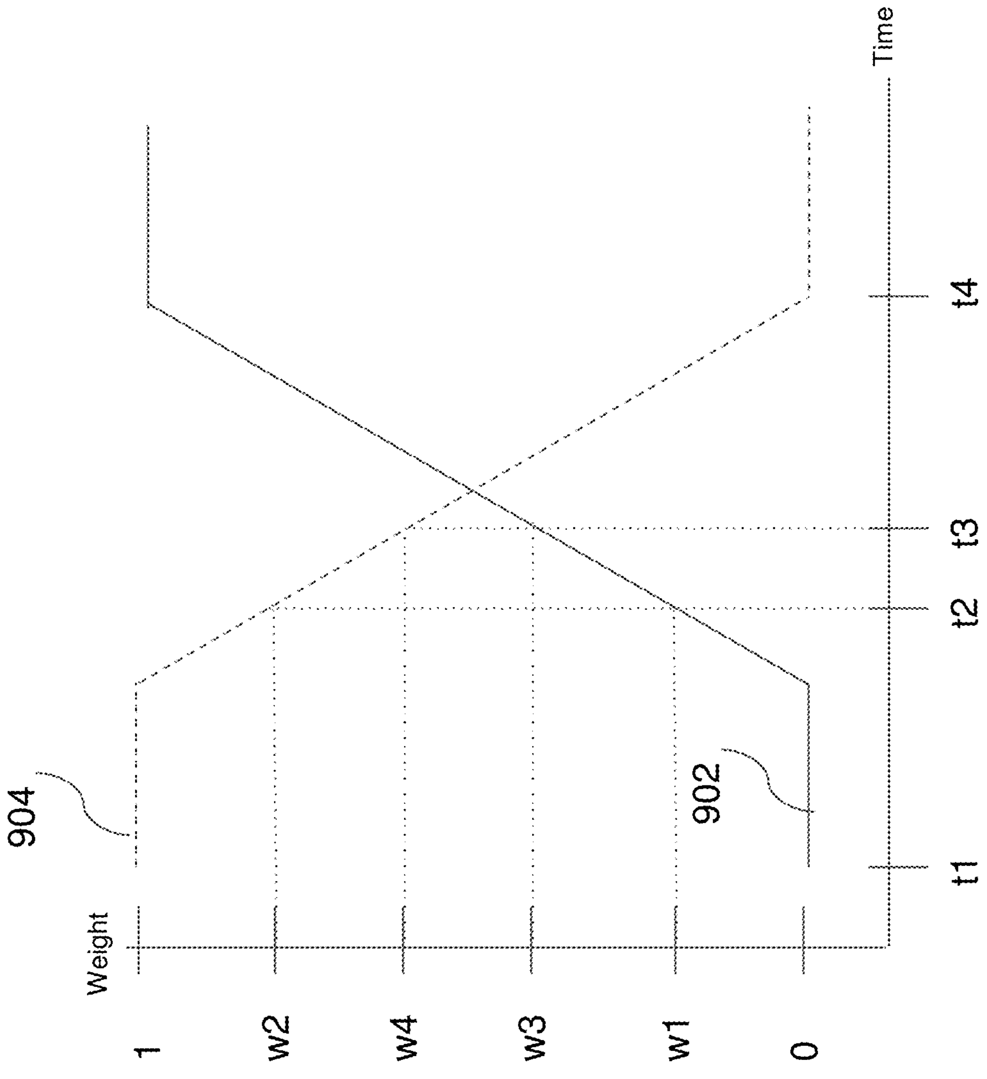
FIG. 9 illustrates a weighting schedule for a first neural network and a weighting schedule for a second neural network.

FIGS. 8A and 8B illustrates a process 800 for processing data using multiple parallel neural networks, in accordance with certain embodiments described herein. In some embodiments, the process 800 may be performed by an ear-worn device (e.g., the ear-worn device 702), which may be a hearing aid. The process 800 may be performed by a neural network system (e.g., the neural network system 100), which may be implemented by neural network circuitry (e.g., 720). A controller, which may be implemented by control circuitry (e.g., the control circuitry 726) may control the neural network system to perform the process 800. The neural network system may include a first neural network (e.g., the neural network 104) and a second neural network (e.g., the neural network 106) operating in parallel. However, it should be appreciated that the neural network system may include more than two neural networks operating in parallel. The neural networks may be recurrent networks, or another type of stateful neural network. The neural network may be trained to denoise audio signals. In some embodiments, one full neural network (e.g., the first neural network) may be operating (e.g., all its layers running) at a given time while at the same time in parallel less than a full neural network (e.g., one layer of the second neural network or fewer than all layers of the second neural network) may be operating in parallel. In some embodiments, two full neural networks may be operating in parallel. FIG. 9, which illustrates a weighting schedule 902 for the first neural network and a weighting schedule 904 for the second neural network, will be referenced in the description of the process 800. However, it should be appreciated that the particular weighting schedules illustrated in FIG. 9 are presented merely as an example, but are not limiting on the weighting schedules that may be used in conjunction with FIGS. 8A and 8B. For example, any of the weighting schemes described herein may be used in conjunction with FIGS. 8A and 8B.

At step 802, the neural network system resets one or more states of the first neural network at a first time. As described above, in some embodiments resetting a state may refer to actively changing values in the state to zero, or actively changing values in the state to a different value other than zero. Additionally, resetting one or more states at a first time may mean actively changing values in the state immediately, or over a finite length of time beginning at the first time. In the latter case, the reset may be smooth, such that the values in the state decay over time to zero or to a different value. In some embodiments in which the first neural network includes just hidden states, all the hidden states may be reset. In some embodiments in which the first neural network includes hidden states and cell states, all the cell states, but not the hidden states, may be reset. In some embodiments, one or more states of only certain (i.e., one or more) layers of a neural network may be reset. For example, all the states of one or more layers of a neural network may be reset, or a subset of the states (e.g., the cell states but not the hidden states in an LSTM) of a layer or a subset of layers of a neural network may be reset. As a particular example, one or more states of one layer may be reset at a time (e.g., as in FIG. 3). In FIG. 9, the first time may be t1.

At step 804, the neural network system receives a first input signal at a second time later than the first time. For example, the input signal may be the input 102. As described above, the input signal may be processed prior to being received by the neural network system. In FIG. 9, the second time may be t2. In the context of a hearing aid, the first input signal may be an input audio signal.

At step 806, the neural network system processes the first input signal using the first neural network to produce a first output and using the second neural network to produce a second output. For example, the first output may be the output 112 and the second output may be output 114. The outputs may be the output of any layer or layers (e.g., one layer) of the neural network. For example, the outputs may be from the first layer of the neural network, an intermediate layer of the neural network, the final layer of the neural network, or any combination of multiple layers. Processing the first input signal should be understood to include processing the input by any layer or layers (e.g., one layer) of a neural network.

As described above, in some embodiments the neural network system may run the first neural network for a warmup period (e.g., the warmup period 210 and/or 510) after the resetting, during which the first neural network is on but the weight used for its output is zero. Thus, if an input is received between step 802 and step 804 and during the warmup period of the first neural network, the neural network system may process the input with both neural networks, but only use the output from the second neural network. Equivalently, the output from the first neural network may be weighted at 0. During the warmup period, the weight for the output from the second neural network may be 1. It should be appreciated that step 806 may also apply during a warmup period for the first neural network. In such a scenario, the first weight may be 0 and/or the second weight may be 1. The warmup period may occur during the time period after t1 in which the schedule 902 is at 0. Additionally, as described above, in some embodiments, prior to the reset time, the neural network system may be configured to turn off the first neural network (e.g., during the off period 612).

At step 808, the neural network system combines the first output and the second output using a first weight for the first output and a second weight for the second output, where the second weight is greater than the first weight. For example, the combiner 110 may combine the first and second outputs. In the example of FIG. 9, the first weight may be w1 (i.e., the weight associated with time t2 on the first weighting schedule 902) and the second weight may be w2 (i.e., the weight associated with time t2 on the second weighting schedule 904), and w2 is greater than w1. The weighting schedules 902 and 904 in FIG. 9 use weights that may depend, at least in part, on how much time has elapsed since the last reset. Weights may transition from low to high (in some embodiments, after an off period and/or warmup period) following a reset, and then transition from high to low before the next reset. However, other weighting schemes may be used. For example, in some embodiments, the weights may be determined based on a confidence metric associated with each neural network's output, such that when the two neural networks are combined, the neural network with the higher quality/confidence is weighted higher. In such embodiments, the first weight may be smaller than the second weight at step 808 based on the confidence associated with the first output being smaller than the confidence associated with the second output. While the weighting schedules 902 and 904 in FIG. 9 are generally formed from linear, piecewise functions, other smooth functions such as sinusoidal functions may be used instead.

In embodiments in which the first output is the output from one layer of the first neural network, and the second output is the output from one layer of the second neural network, the neural network system may feed the combined first and second outputs to a subsequent layer of the first neural network.

Additionally, in some embodiments, the first output from the first neural network may include a combination of multiple outputs from the first neural network, and the second output from the second neural network may include a combination of multiple outputs from the second neural network, such as the votes described with reference to FIG. 4. As further described with reference to FIG. 4, because a neural network may produce one vote and then produce another vote at a later time, the neural network system may be configured to wait until a neural network has produced the multiple outputs prior to determining the first output.

At step 810, the neural network system receives a second input signal at a third time later than the second time. Further description of receiving input signals may be found with reference to step 804. In FIG. 9, the third time may be t3.

At step 812, the neural network system processes the second input signal using the first neural network to produce a third output and using the second neural network to produce a fourth output. Further description of processing input signals may be found with reference to step 806.

At step 814, the neural network system combines the third output and the fourth output using a third weight for the third output and a fourth weight for the fourth output, where the third weight is greater than the first weight. Further description of combining outputs may be found with reference to step 808. In the example of FIG. 9, the third weight may be w3 (i.e., the weight associated with time t3 on the first weighting schedule 902) and the fourth weight may be w4 (i.e., the weight associated with time t3 on the second weighting schedule 904), and w3 is greater than w1. Additionally, in the example of FIG. 9, the fourth weight is smaller than the second weight. In some embodiments, at step 814, the third and fourth weights may be different (e.g., 0.25 and 0.75). In some embodiments, the third and fourth weights may be the same (e.g., 0.5). In some embodiments, the third weight may be smaller than the fourth weight at step 814. In some embodiments, the third weight may be larger than the fourth weight at step 814.

At step 816, the neural network system resets one or more states of the second neural network at a fourth time later than the third time. Further description of resetting states may be found with reference to step 802. In the example of FIG. 9, the fourth time may be t4.

In some embodiments, following step 816, the process 800 may repeat from step 804, but with the roles of the first neural network and the second neural network reversed. Thus, the neural network system may receive a third input signal at a fifth time later than the fourth time; process the third input signal using the first neural network to produce a fifth output and using the second neural network to produce a sixth output; combine the fifth output and the sixth output using a fifth weight for the fifth output and a sixth weight for the sixth output, where the fifth weight is greater than the sixth weight; receive a fourth input signal at a sixth time later than the fifth time; process the fourth input signal using the first neural network to produce a seventh output and using the second neural network to produce an eight output; and combine the seventh output and the eighth output using a seventh weight for the seventh output and an eighth weight for the eighth output, where the eighth weight is greater than the sixth weight.

Additionally, in embodiments in which one or more states of one layer of the first neural network were reset at step 802, at a later time, one or more states of a different layer of the first neural network may be reset.

It should be appreciated that while the above description may focus on ear-worn devices, such as hearing aids, the features described may be implemented in any type of apparatus using a neural network system. Thus, any apparatus may have neural network circuitry configured to implement a neural network system including at least a first neural network and a second neural network operating in parallel, and control circuitry configured to control the neural network system to receive a first input signal (which need not necessarily be an input audio signal), process the first input signal using the first neural network to produce a first output and using the second neural network to produce a second output, combine the first output and the second output, reset one more states of the first neural network, and reset one or more states of the second neural network at a different time than when the one or more states of the first neural network are reset.

Having described several embodiments of the techniques in detail, various modifications and improvements will readily occur to those skilled in the art. Such modifications and improvements are intended to be within the spirit and scope of the invention. Accordingly, the foregoing description is by way of example only, and is not intended as limiting. For example, any components described above may comprise hardware, software or a combination of hardware and software.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having described above several aspects of at least one embodiment, it is to be appreciated various alterations, modifications, and improvements will readily occur to those skilled in the art. Such alterations, modifications, and improvements are intended to be objects of this disclosure. Accordingly, the foregoing description and drawings are by way of example only.

What is claimed is:

1. A chip, comprising:

neural network circuitry configured to implement a neural network system comprising at least a first neural network and a second neural network operating in parallel; and control circuitry configured to control the neural network system to:

reset one or more states of the first neural network at a first time;

receive a first input at a second time later than the first time;

process the first input using the first neural network to produce a first output and using the second neural network to produce a second output;

combine the first output and the second output using a first weight for the first output and a second weight for the second output, wherein the second weight is greater than the first weight;

receive a second input at a third time later than the second time;

process the second input using the first neural network to produce a third output and using the second neural network to produce a fourth output;

combine the third output and the fourth output using a third weight for the third output and a fourth weight for the fourth output, wherein the third weight is greater than the first weight; and reset one or more states of the second neural network at a fourth time later than the third time.

2. The chip of claim 1, wherein the control circuitry is further configured to control the neural network system to:

receive a third input at a fifth time later than the fourth time;

process the third input using the first neural network to produce a fifth output and using the second neural network to produce a sixth output;

combine the fifth output and the sixth output using a fifth weight for the fifth output and a sixth weight for the sixth output, wherein the fifth weight is greater than the sixth weight;

receive a fourth input at a sixth time later than the fifth time;

process the fourth input using the first neural network to produce a seventh output and using the second neural network to produce an eighth output; and combine the seventh output and the eighth output using a seventh weight for the seventh output and an eighth weight for the eighth output, wherein the eighth weight is greater than the sixth weight.

3. The chip of claim 1, wherein all layers of the first neural network operate at a given time and fewer than all layers of the second neural network operate in parallel at the given time.

4. The chip of claim 3, wherein the control circuitry is further configured to control the neural network system, when resetting the one or more states of the first neural network at the first time, to reset one or more states of one layer of the first neural network.

5. The chip of claim 4, wherein the control circuitry is further configured to control the neural network system to reset one or more states of a different layer of the first neural network at a time later than the first time.

6. The chip of claim 3, wherein the control circuitry is further configured to control the neural network system, when processing the first input using the first neural network to produce the first output and using the second neural network to produce the second output, to process the first input using one layer of the first neural network to produce the first output and to process the first input using one layer of the second neural network to produce the second output.

7. The chip of claim 6, wherein the control circuitry is further configured to control the neural network system to feed the combined first and second outputs to a subsequent layer of the first neural network.

8. The chip of claim 1, wherein the control circuitry is further configured to control the neural network system to run the first neural network for a warmup period after the first time and weight an output of the first neural network at zero.

9. The chip of claim 8, wherein the control circuitry is further configured to control the neural network system to turn off the first neural network for an off period prior to the first time.

10. The chip of claim 1, wherein weights applied to outputs of the first neural network depend, at least in part, on how much time has elapsed since the resetting of the one or more states of the first neural network.

11. The chip of claim 10, wherein the weights applied to the outputs of the first neural network transition from low to high after the resetting of the one or more states of the first neural network, and then transition from high to low prior to a next resetting of the one or more states of the first neural network.

12. The chip of claim 1, wherein the first input comprises an audio signal.

13. The chip of claim 1, wherein the first output from the first neural network comprises a combination of multiple outputs from the first neural network.

14. The chip of claim 13, wherein the control circuitry is further configured to control the neural network system to wait until the first neural network has produced the multiple outputs prior to the producing of the first output.

15. The chip of claim 1, wherein the control circuitry is further configured to determine the first and second weights from a weighting scheme comprising a linear piecewise function or a smooth function.

16. The chip of claim 1, wherein a time between resets of the one or more states of the first neural network is approximately equal to or between 1 second and 60 seconds.

17. The chip of claim 1, wherein the first neural network and the second neural network are trained to denoise audio signals.

18. The chip of claim 1, wherein the first neural network and the second neural network comprise a same algorithm and same parameters.

19. The chip of claim 1, wherein the first neural network and the second neural network comprise at least one of a different algorithm and different parameters.

20. The chip of claim 1, wherein the first neural network and the second neural network comprise recurrent neural networks.

* * * * *